US008433747B2

(12) United States Patent
Qiu et al.

(10) Patent No.: US 8,433,747 B2
(45) Date of Patent: Apr. 30, 2013

(54) GRAPHICS REMOTING ARCHITECTURE

(75) Inventors: Kan Qiu, Bellevue, WA (US); Nadim Y. Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 12/024,848

(22) Filed: Feb. 1, 2008

(65) Prior Publication Data

US 2009/0195537 A1 Aug. 6, 2009

(51) Int. Cl.
*G06F 15/16* (2006.01)

(52) U.S. Cl.
USPC ............. 709/203; 709/205; 709/223; 712/32; 345/501; 345/531; 345/543

(58) Field of Classification Search .................. 709/205, 709/223; 712/32; 345/501, 531, 543
See application file for complete search history.

(56) References Cited

U.S. PATENT DOCUMENTS

| 5,487,172 | A | * | 1/1996 | Hyatt ............................... 712/32 |
| 5,983,218 | A | | 11/1999 | Syeda-Mahmood |
| 6,176,883 | B1 | * | 1/2001 | Holloway et al. ............. 709/223 |
| 6,456,737 | B1 | * | 9/2002 | Woodfill et al. .............. 382/154 |
| 6,567,091 | B2 | * | 5/2003 | Dye et al. ...................... 345/501 |
| 6,618,053 | B1 | | 9/2003 | Tanner |
| 6,714,200 | B1 | * | 3/2004 | Talnykin et al. .............. 345/473 |
| 6,877,027 | B1 | * | 4/2005 | Spencer et al. ............... 709/205 |
| 6,989,836 | B2 | | 1/2006 | Ramsey |
| 7,081,904 | B2 | | 7/2006 | Zoller et al. |
| 7,095,421 | B2 | * | 8/2006 | Vijayakumar et al. ........ 345/613 |
| 7,162,528 | B1 | * | 1/2007 | Simonoff et al. ............. 709/229 |
| 7,234,144 | B2 | * | 6/2007 | Wilt et al. ...................... 718/104 |
| 7,326,117 | B1 | * | 2/2008 | Best ................................ 463/32 |
| 7,424,482 | B2 | * | 9/2008 | Kedem et al. ......................... 1/1 |
| 8,144,187 | B2 | * | 3/2012 | Moore et al. ................ 348/14.12 |
| 2001/0055341 | A1 | * | 12/2001 | Herrmann et al. ........ 375/240.25 |
| 2002/0135585 | A1 | * | 9/2002 | Dye et al. ...................... 345/531 |
| 2002/0145611 | A1 | * | 10/2002 | Dye et al. ...................... 345/543 |
| 2003/0202513 | A1 | * | 10/2003 | Chen et al. .................... 370/390 |
| 2003/0225865 | A1 | * | 12/2003 | Koestler ........................ 709/220 |

(Continued)

FOREIGN PATENT DOCUMENTS

| JP | 2002063601 A | 2/2002 |
| KR | 20060067248 A | 6/2006 |
| WO | 98/58478 A2 | 12/1998 |
| WO | 2009/099689 A1 | 8/2009 |

OTHER PUBLICATIONS

Buck, et al., "Tracking Graphics State for Networked Rendering", available at least as early as Sep. 4, 2007, at <<http://www.cs.virginia.edu/~gfx/pubs/state_tracking/state_tracking.pdf>>, pp. 9.
Stegmaier, et al., "A Generic Solution for Hardware-Accelerated Remote Visualization", at <<http://delivery.acm.org/10.1145/510000/509754/p87-094-stegmaier.pdf?key1=509754& key2=3544698811&coll=GUIDE&dl=GUIDE&CFID=33997675&CFTOKEN=72193700>>, The Eurographics Association, 2002, pp. 87-94.

(Continued)

*Primary Examiner* — Thu Ha Nguyen
(74) *Attorney, Agent, or Firm* — Merchant & Gould P.C.

(57) ABSTRACT

Systems and methods to implement a graphics remoting architecture for rendering graphics images at remote clients are disclosed. In one implementation, when a D3D application hosted on a remote server is used by a remote client, the graphics associated with the D3D application are created and rendered at the remote client. For this, the D3D commands and D3D objects corresponding to the graphics are abstracted into data streams at the remote server. The data streams are then sent to the remote client. At the remote client, the D3D commands and D3D objects are extracted from the data streams and executed to create the graphics images. The graphics images are then rendered and displayed using output devices at the remote client.

22 Claims, 6 Drawing Sheets

U.S. PATENT DOCUMENTS

| | | | |
|---|---|---|---|
| 2004/0045030 A1* | 3/2004 | Reynolds et al. | 725/110 |
| 2005/0104889 A1 | 5/2005 | Clemie et al. | |
| 2006/0069797 A1 | 3/2006 | Abdo et al. | |
| 2007/0005734 A1 | 1/2007 | Abdo | |
| 2007/0043550 A1 | 2/2007 | Tzruya | |
| 2007/0073660 A1* | 3/2007 | Quinlan | 707/3 |
| 2007/0079244 A1 | 4/2007 | Brugiolo | |
| 2007/0097130 A1 | 5/2007 | Margulis | |
| 2008/0082670 A1* | 4/2008 | Gounares et al. | 709/228 |
| 2008/0082671 A1* | 4/2008 | Meijer et al. | 709/228 |
| 2008/0282299 A1* | 11/2008 | Koat et al. | 725/93 |

OTHER PUBLICATIONS

Chinese Second Office Action in Application 200980103999.X mailed Aug. 17, 2012, 6 pages.

Chinese First Office Action in Application 200980103999.X mailed Feb. 29, 2012, 9 pages.

PCT International Search Report in Application PCT/US2009/030201, mailed Jun. 8, 2009, 11 pages.

Chinese Third Office Action in Application 200980103999.X mailed Feb. 21, 2013, 6 pages.

* cited by examiner

GRAPHICS REMOTING ARCHITECTURE

BACKGROUND

Graphics software for creating high-end graphics applications, such as photo-editing, gaming, etc., may include animation and other tools that make use of complex calculations. Typically, such high-end graphics applications employ various technologies to provide graphics hardware support to manage the complex calculations. For example, graphics applications ran on Microsoft® Windows® operating system, may employ Direct3D rendering technologies to provide graphics hardware support. Direct3D is a three-dimensional (3D) graphics Application Programming Interface (API) that includes commands for rendering 3D images in graphics applications.

Although most personal computers (PCs) currently provide such graphics hardware support, there has been no efficient way of remoting such technologies. For example, in remote sessions, the graphics applications may not scale up with the window size or the number of user connections and can also create stability issues. Furthermore, graphics acceleration may not be available on server computers running Video Graphics Adapter (VGA) or on virtual machines. As a result, graphics applications running over remote sessions can cause poor end user experiences.

SUMMARY

This summary is provided to introduce simplified concepts related to Graphics remoting architecture, which are further described below in the Detailed Description. This summary is not intended to identify essential features of the claimed subject matter, nor is it intended for use in determining the scope of the claimed subject matter.

In an embodiment, a three dimension (3D) application hosted on a server computer is used by a remote client computer. The graphics associated with the 3D application are created and rendered at the remote client computer, by the use of 3D commands and 3D objects corresponding to graphics abstracted into data streams at the remote server and sent to the client computer. The 3D commands and 3D objects are extracted from the data streams and executed to create the graphics images at the client computer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure relates to methods and systems for implementing a remoting architecture to facilitate rendering of three dimensional or 3D images at a remotely located client and achieve an enhanced end user experience in a remote session. Typically, in a remote environment, such as a Terminal Services® environment, any graphics-intense application commands, such as Direct3D or D3D commands, are executed at a server. After execution of the commands, the output, such as graphics images, is rendered with the help of the Graphics Processing Unit (GPU) of the server. The rendered graphics images are then sent to a client device as a bitmap image and are displayed through a display device at the client side. Running Direct3D or three dimension applications in such a manner is limited by architectural factors such as server availability, scalability, server stability, and causes poor end user experience. In particular, architectural limitations may include a lack of frame rate control and inadequateness of progressive texture rendering when compression and other specialized methods are employed.

Techniques for implementing Direct3D remoting architecture to enable rendering of 3D graphics images at a remote client are disclosed in the following description. In one implementation, instead of rendering graphics images at a server computer and then sending the final bitmap images to a client device. The D3D commands can be sent directly to the client device that may then execute the D3D commands. A GPU at the client device end renders the output such as the graphics images and displays the images at the client end. Thus the graphics images can be rendered at the client device without employing the GPU at the server end. Furthermore, techniques for implementing frame rate control and progressive texture rendering methods to overcome the above mentioned architectural limitations are disclosed.

Methods and systems to implement a Direct3D remoting architecture for rendering 3D graphics images at a client device are disclosed in the following description.

Exemplary Network Environment

Figure 1:
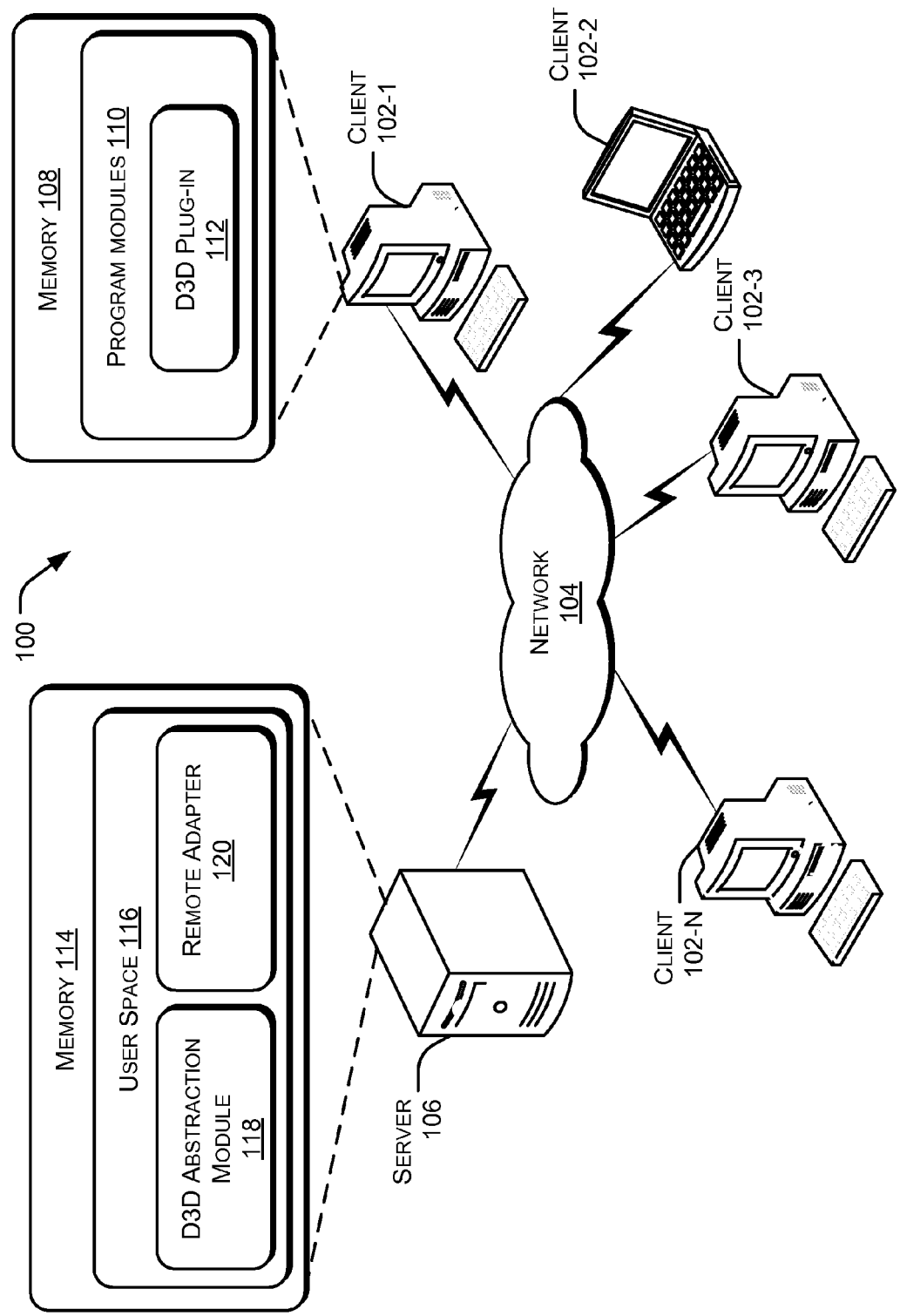
FIG. 1 is a block diagram illustrating an exemplary network environment for implementing a 3D remoting architecture.

FIG. 1 illustrates an exemplary network or computing environment 100 for implementing a 3D or Direct3D (D3D) remoting architecture, which may implement techniques described herein, and which may be representative, in whole or in part, of elements described herein. The computing environment 100 is an example of a computing environment, and is not intended to suggest any limitation to the scope of use and/or functionality of the computer and network architectures used.

The computing environment 100 includes a plurality of client devices 102-1, 102-2, 102-3, . . . , 102-N (collectively referred to as clients 102). The clients 102 are communicatively associated through a network 104 with a server computer or server 106. The clients 102 may be any of a variety of conventional computing devices, for example, a desktop PC, a notebook or a portable computer, a Personal Digital Assistant (PDA), a workstation, a mobile computing device, or an Internet appliance, etc. Each client 102 may include a memory that stores different program modules for rendering. For example, the client 102-1 includes a memory 108 that may store different program modules 110 such as a D3D Plug-in 112 and other modules to perform rendering.

The network 104 may be a wireless or a wired network, or a combination thereof. The network 104 may also be represented as a collection of individual networks interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may also be wireless or wired networks, or a combination thereof.

The server 106 may be, for example, a general purpose computing device or a cluster of servers and mainframes. The server 106 includes a memory 114 having a user space 116 that corresponds to a client, such as client 102-1. The user space 116 further includes a D3D abstraction module 118 and a remote adapter 120. The remote adapter 120, at the server 106, establishes a connection with the client to send graphics commands abstracted by the D3D abstraction module 118 for rendering.

In one implementation, the D3D abstraction module 118 executes on a Terminal Server (TS)/D3D abstraction layer. The D3D abstraction layer is implemented between the physical hardware of the server 106 and the graphics applications such as D3D applications. The abstraction layer hides the implementation details of the hardware from such applications.

The D3D abstraction module 118 receives one or more D3D commands and D3D objects from a D3D application, when a client such as the client 102-1 uses the D3D application at the server 106 over a remote session. The D3D abstraction module 118 further abstracts the communication between the D3D application and graphics hardware that execute the D3D application.

The D3D abstraction module 118 abstracts the D3D commands and D3D objects into data streams that can be sent over the network 104. The D3D abstraction module 118 thus enables the server 106 to send the abstracted commands and objects as data streams to one or more of the clients 102. The data streams are sent via the network 104 based on different remoting protocols, such as Remote Desktop Protocol (RDP), D3D Remoting Protocol, etc.

To send the data streams from the server 106 to the client 102-1, the remote adapter 120 establishes a communication channel with the D3D plug-in 112 of the client 102-1 over the network 104. The remote adapter 120 checks availability and capability of the display adapter at the client 102-1 from the D3D plug-in 112. On receiving confirmation from the D3D plug-in 112, the remote adapter 120 establishes the communication channel between the D3D abstraction module 118 and the D3D plug-in 112.

The D3D abstraction module 118 sends the abstracted D3D commands and D3D objects associated with the D3D application to the D3D plug-ins at the client 102-1. In one implementation, the D3D abstraction module 118 sends the abstracted D3D commands and the D3D objects as hidden data to the D3D plug-in 112.

At the client-end (i.e., client 102), the data streams are received and processed by one or more D3D plug-ins, such as the D3D plug-in 112. The D3D plug-in 112 receives the data streams, and parses the data streams to extract the D3D commands. Furthermore, the D3D plug-in creates actual D3D objects, executes the D3D commands, and renders the output such as graphics images using the GPU at the client end.

Exemplary Server

Figure 2:
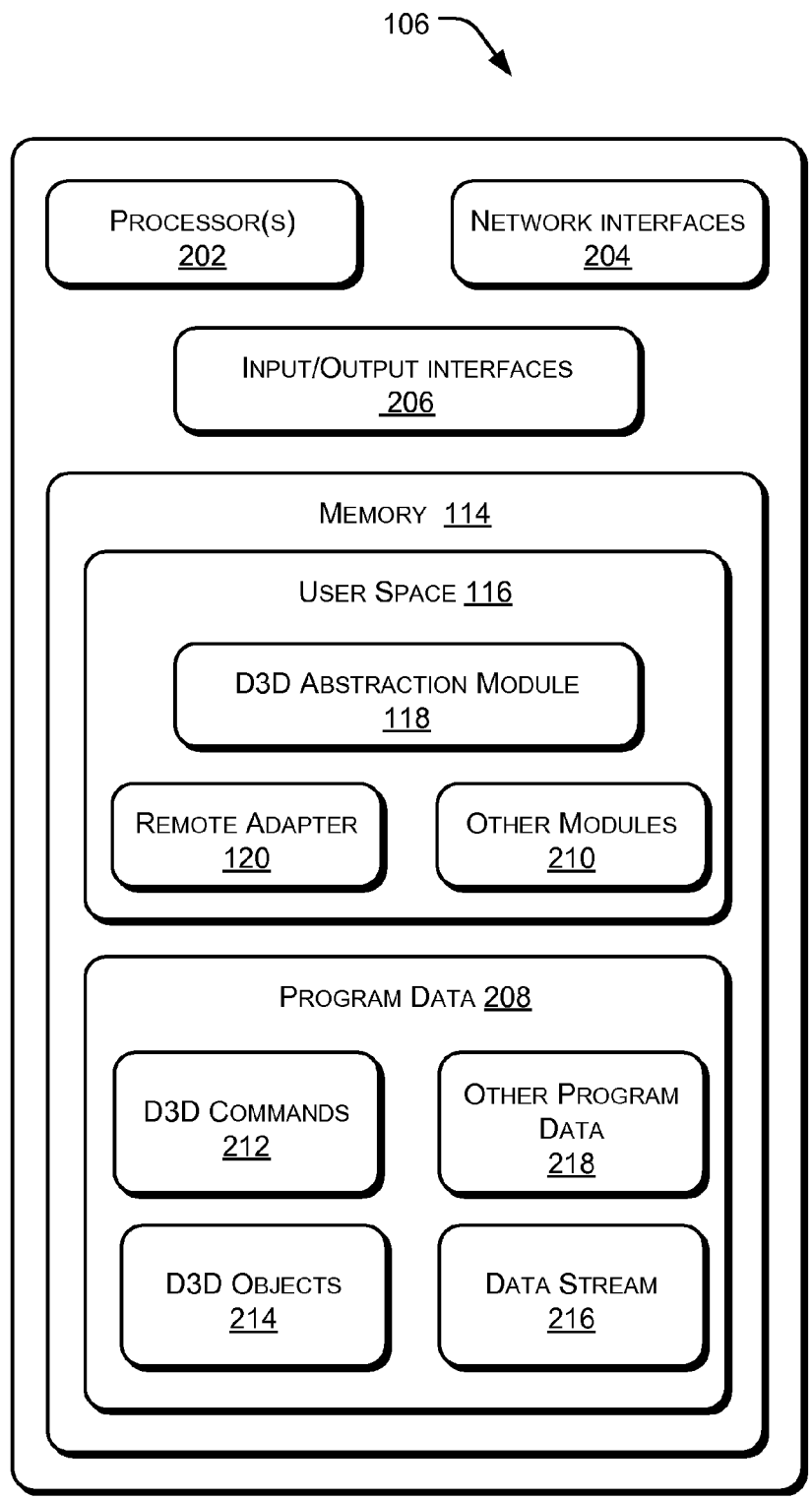
FIG. 2 is a block diagram illustrating an exemplary computing server for implementing remote rendering of 3D images.

FIG. 2 is an exemplary server 106 for implementing remote rendering of 3D images. The server 106 can be a computing device that includes a processor 202, network interface(s) 204, input/output interface(s) 206, and the memory 114. The network interface(s) 204 may include one or more ports for connecting a number of computing devices, such as the clients 102 to each other, or to the server 106. The network interface(s) 204 can facilitate communications with a wide variety of networks and protocol types, including wired networks (e.g., LAN, cable, etc.) and wireless networks (e.g., WLAN, cellular, satellite, etc.).

The input/output interface(s) 206 may include, for example, a scanner a port, a mouse port, a keyboard port, etc., to receive/send data from/to the clients 102. In one implementation, the input/output interface(s) 206 of the server 106 send data, such as the D3D commands and the D3D objects over the network 104. The input/output interface(s) 206 of the server 106 receive data from one or more clients 102, such as data or contents that represent the rendered graphics images for synchronization purposes.

The memory 114 can be any computer-readable media in the form of both volatile memory, such as Random Access Memory (RAM), and/or non-volatile memory, such as Read Only Memory (ROM) and a flash RAM. The memory 114 typically includes data and/or program modules that are immediately accessible to and/or presently operated on by the processor 202.

In one implementation, the memory 114 includes a user space 116 corresponding to each of the clients 102, and program data 208. Each user space 116 may include a D3D abstraction module 118, and a remote adapter 120 in addition to other modules 210. The program data 208 may store parameters including D3D commands 212, D3D objects 214, data streams 216, and other program data 218.

The D3D abstraction module 118 can be configured to monitor data traffic that includes the D3D commands 212 and the D3D objects 214. As described in further detail below, the D3D abstraction module 118 can be configured to receive the D3D commands 212 and the D3D objects 214 from the D3D application through a D3D API. The D3D API includes functions that can be used to render 3D images in the D3D application. In another implementation, the D3D abstraction module 118 can be configured to receive the D3D commands 212 and the D3D objects 214 directly from the D3D application.

In one implementation, the received D3D commands 212 may be high frequency commands, which may require one or more network roundtrips from the clients 102. Such network roundtrips may cause delay in execution of the high frequency commands. To avoid such network roundtrips, the D3D abstraction module 118 can be configured to assign a handle or an identifier to each of the D3D objects in the abstraction layer. The D3D abstraction module 118 then records the handle in the data streams 216 along with other parameters for creating the D3D object on the client-end. The handles can be stored in the other program data 218 in the memory 114 of the server 106.

The D3D abstraction module 118 abstracts the D3D commands 212 and the D3D objects 214 into the data streams 216 and sends them over the network 104. For this, the remote adapter 120 enquires about the availability and capability of the display adapter of the client 102-1. Upon receiving confirmation of availability and capability from the D3D plug-in 112 at the client 102-1, the remote adapter 120 establishes a communication channel between the D3D abstraction module 118 and the D3D plug-in 112. The D3D abstraction module 118 sends the abstracted D3D commands 212 and the D3D objects 214 to the D3D plug-in 112 of the client 102-1 via the communication channel.

In addition to abstraction, the D3D abstraction module 118 can be configured to perform centralized resource encoding. The centralized resource encoding encompasses compression and decimation methods known in the art for encoding the available D3D resources. This enables efficient use of the bandwidth of the server 106 for multiple applications and reconnections. For example, a D3D application may utilize D3D resources, such as a texture map, mesh data, or a normal bitmap image that may be larger in size than the available bandwidth. In such cases, the D3D abstraction module 118 employs known compression and/or decimation methods to reduce the size of the resources. The resource encoding process can be centralized so that a system wide persistent caching can be performed to use the bandwidth of the server 106 in an efficient manner.

Exemplary Client

Figure 3:
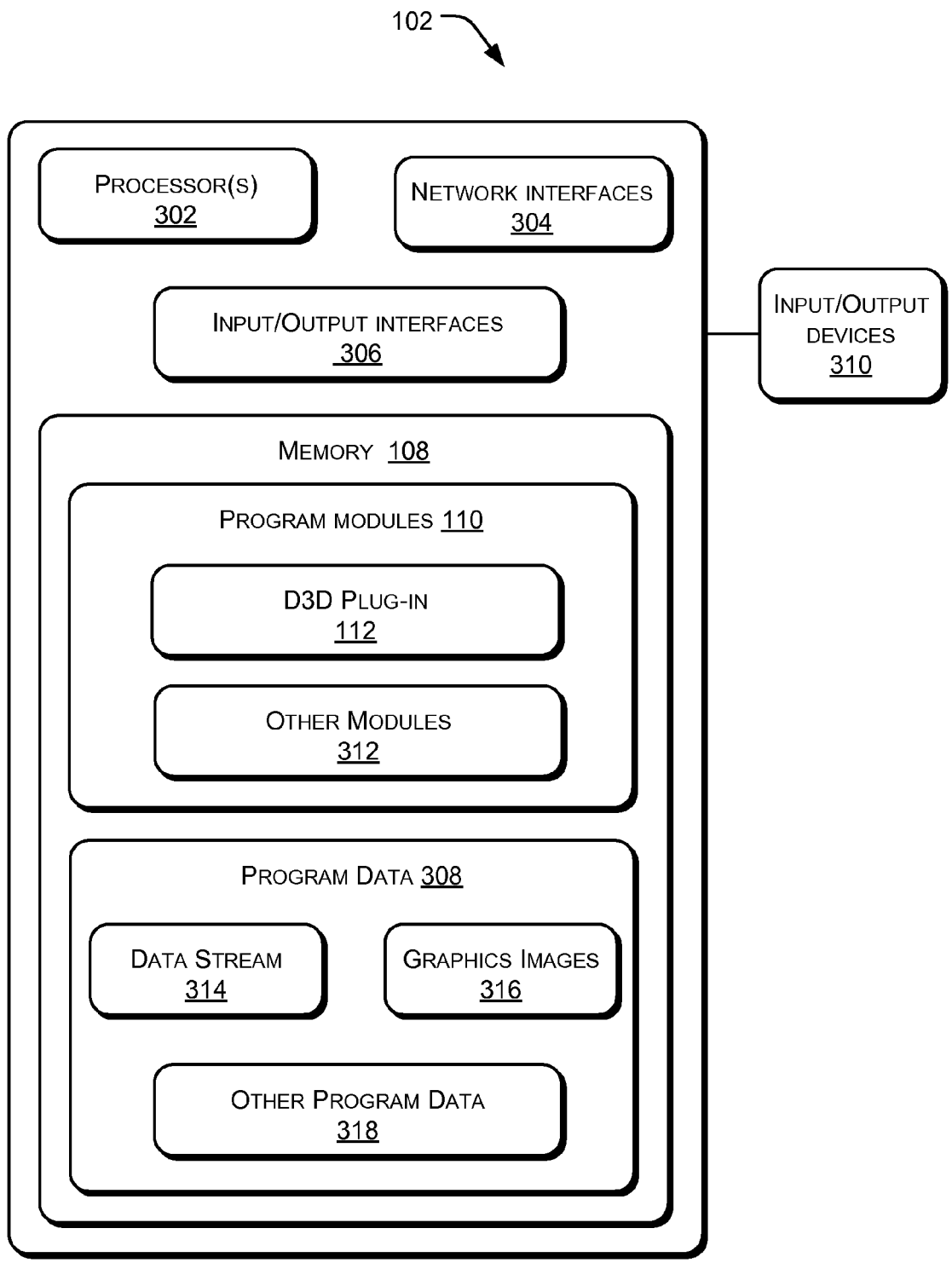
FIG. 3 is a block diagram illustrating an exemplary client for implementing remote rendering of 3D images.

FIG. 3 illustrates an exemplary client 102 for implementing remote rendering of 3D images. The exemplary client 102 can be any of the clients 102, for example client 102-1, and includes a processor 302, network interface(s) 304, input/output interface(s) 306, the memory 108, and input/output device(s) 310. The network interface(s) 304 facilitate communication between the clients 102 across the network 104.

In the exemplary implementation, the network interface(s) 304 may include one or more ports for connecting the client 102-1 either to the server 106 or to the clients 102 other than the client 102-1. The network interface(s) 304 can facilitate communications with a wide variety of networks and protocol types, including wired networks (e.g. LAN, cable, etc.) and wireless networks (e.g. WLAN, cellular, satellite, etc.).

The input/output interface(s) 306 may include, for example, a scanner a port, a mouse port, a keyboard port, etc., to receive/send data from/to the clients 102. In one implementation, the input/output interface(s) 306 of the client 102-1 receive data, such as, for example, the D3D commands 212 and the D3D objects 214 over the network 104.

The input/output interface(s) 306 of the client 102-1 send data to the server 106, such as data or contents that represent the rendered graphics images for synchronization purposes. The input/output interface(s) 306 can display data, such as rendered graphics images by the input/output devices 310.

The memory 108 can be any computer-readable media in the form of both volatile memory, such as Random Access Memory (RAM) and/or non-volatile memory, such as Read Only Memory (ROM) and/or a flash RAM. The memory 108 includes data and/or program modules that may be immediately accessible to and/or operated on by the processor 302. In the exemplary implementation, the memory 108 includes the program modules 110 and a program data 308. The program modules 110 may include the D3D Plug-in 112, and other modules 312. The program data 308 may store parameters including data streams 314, graphics images 316, and other program data 318.

The D3D Plug-in 112 receives the data streams 314 that include D3D commands 212 and D3D objects 214, and extracts the D3D commands 212. Furthermore, the D3D plug-in 112 executes the D3D commands 212 and renders output graphics images by using the GPU at the client end. In one implementation, the D3D plug-in 112 of the client 102-1 may be configured to receive the data streams 314 from the server over the network 104. The D3D Plug-in 112 can be configured to parse the data streams 314 using any parsing methods known in the art, and extract D3D commands 212 from the data streams 314.

The D3D plug-in 112 can be configured to create D3D objects 214 with the use of handles received along with the data streams 314. As discussed above, a handle has an entry that includes the address of a resource associated with a graphics application such as a D3D application, so that the objects such as the D3D objects 214 can be identified, examined, created, and/or modified. Therefore, the D3D objects can be assigned handles to create the actual D3D objects 214 at the client end by the D3D plug-in 112. The D3D plug-in 112 can then execute the D3D commands 212, and render the graphics images 316 using the GPU at the client. The rendering of the graphics images 316 can be performed by rendering methods known in the art.

In addition to rendering, the D3D Plug-in 112 may be configured to track changes in geometry of the window displayed on the desktop of the server 106 to change accordingly the representation of the server desktop at the client 102-1. The changes in window geometry can include window resizing, window movement or positioning, and/or visible region changes in the desktop of the server 106.

To support changes in window geometry, a proxy window can be used at the client 102-1 to reproduce the geometrical changes occurring at the window of the server 106. The proxy window ensures interoperability with any window activated in the same session, such as windows at the server 106 and windows at the clients 102. The proxy window can be established at the clients 102, for example, when the desktop composition feature is disabled. Desktop composition is a feature that changes the way pixels of a graphics image are displayed on the display screen of the client and can be controlled by a Desktop Window Manager of the server 106.

The D3D Plug-in 112 may also be configured to present Direct3D graphics in the full screen exclusive mode on the client 102 side, for example, at the client 102-1. The full screen exclusive mode of display automatically captures, sets/restores screen resolution and pixel format without intervention from a user. A client window may be a simple window used for displaying images. However, a Direct3D application runs under a full screen exclusive mode of display, that may not be supported by the simple window format. The D3D Plug-in 112 presents the graphics under full screen exclusive mode with full screen representation at the window of the clients, and enhancing the user experience.

The D3D Plug-in 112 may be configured to send information related to rendered graphics images 316 to the server 106 in case the server requires the information for synchronization. In one implementation, the D3D plug-in 112 renders the output graphics images at the window of the client 102-1 based on a client-side-only rendering protocol. In such a case, the content to be rendered is stored at the clients 102 by default, which can also be sent to the server 106 in case the server needs the content. Therefore, the D3D plug-in 112 can be further configured to allow tracking and synchronization between the perceived, invisible desktop of the server 106 and the visible client 102 side representation of the server 106 desktop.

Furthermore, to achieve synchronization and content coherency, the D3D plug-in 112 can be configured to track various Direct3D commands 212 issued from the server 106 and read/write accesses made to the desktops of the clients 102. The D3D plug-in 112 can further maintain updated information about each pixel sent/received by both the server 106 and the clients 102, such as the client 102-1. The information about the pixels can be updated for synchronization, for example when the desktop composition is disabled.

Exemplary Architecture

Figure 4:
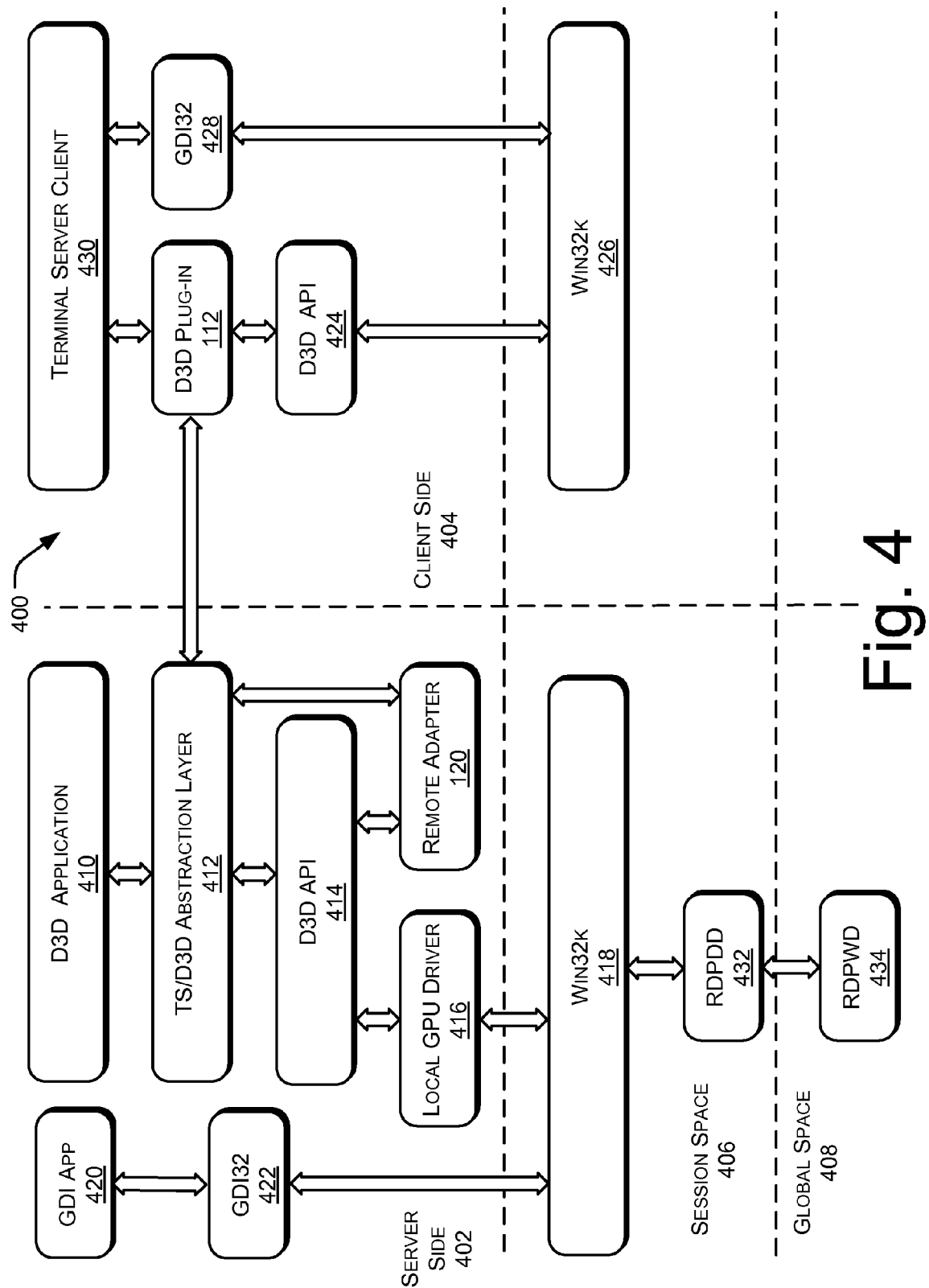
FIG. 4 is a block diagram illustrating an exemplary implementation of a 3D remoting architecture.

FIG. 4 illustrates an exemplary implementation of Direct3D (D3D) remoting architecture 400. Architecture 400 is a logical view of the D3D remoting architecture showing related components used to render graphics images in remote sessions. The architecture 400 can include a group of components that operate at a server side 402 (e.g., server 106). The components of the server side 402 receive D3D commands from the D3D application, abstract the D3D commands, and D3D objects as a data streams to be sent over the network to a client side 404 (e.g., client 102). The client side 404 includes a group of components related to a client 102, such as the client 102-1. The components at the client side 404 receive the data stream, extract the D3D commands, create actual D3D objects, execute the D3D commands, and render the output graphics images at the client end. The architecture 400 may further include components accessed by the server 106 or the clients 102 in the same session referred to as a session space 406, and components accessed by the server 106 or the clients 102 in other sessions referred to as a global space 408.

In one implementation, the D3D application 410 at the server side 402 receives one or more D3D commands 212 as input from users. The D3D application 410 can be a high-end graphics application, such as a gaming application, that involves complex calculations. For such applications, the D3D commands 212 and D3D objects 214 are abstracted as the data streams 216 at a Terminal Server® TS/D3D abstraction layer 412. In one implementation, a D3D abstraction module 118 can execute on the Terminal Server® TS/D3D abstraction layer 412 to abstract the commands and objects. Furthermore, the D3D abstraction module 118 assigns handles to one or more of the D3D objects 214, such that the actual D3D objects 214 can be created using the handles at the client end.

For abstracting the D3D commands 212 and the D3D objects, the D3D abstraction module 118 communicates with a D3D API 414; however, in certain cases applications may implement a service side GPU (i.e., local GPU Driver 416) if it's available. If this is the case (or by default per OS policy) the GPU driver 416 may be present locally in the server 106 and can communicate with a Win32k process 418. In other words, remote adapter 120, representing remote GPU at a client (e.g., clients 102 such as the client 102-1), can be running side by side with local GPU Driver 416 present; however local GPU Driver 416 may not be present for this remoting architecture to function. Local GPU Driver 416 illustrates how the remoting architecture could be integrated with existing local graphics architecture.

The Win32k process 418 is a Windows® operating system kernel process providing the lowest-level abstraction for computing resources, such as the memory, the processor(s), and input/output devices. The Win32k process 418 communicates with a Graphical Device Interface (GDI) GDI App 420 that performs the graphics related tasks. The GDI App 420 can be a Microsoft® Windows® operating system interface used for representing graphical objects and transmitting the graphical objects to output devices, such as monitors and printers. The GDI App 420 can perform graphics related tasks such as drawing lines and curves, and rendering fonts.

In one implementation, for performing such graphics related tasks, the GDI App 420 uses a GDI32 process 422. The GDI32 process 422 includes functions for the Windows® operating system GDI of the server to create objects and process information for displaying images on the display window of a client 102. The GDI32 process 422 performs graphics related functions, such as creating D3D objects 214 for the D3D applications 410.

After creating the D3D objects 214, the D3D commands 212 and the D3D objects 214 are communicated to the D3D application 410 and D3D API 414. During the communication, the D3D abstraction module 118 at the D3D abstraction layer 412 abstracts the D3D commands 212 and the D3D objects 214 into the data streams 216. The D3D abstraction module 118 also abstracts handles of the D3D objects 214 into the data streams 216.

The D3D abstraction module 118 sends the data streams 216 to the clients 102 via the network 104. For this, the remote adapter 120 enquires about the availability and the capability of the display adapters of the clients 102 such as the client 102-1. On receiving a confirmation from the D3D plug-in 112 of the client 102-1, the remote adapter 120 establishes a communication channel to send the data streams 216 over the network 104.

At the client side 404, the D3D plug-in 112 receives data streams 314 via the communication channel established by the remote adapter 120. The data streams 314 received by the D3D plug-in 112 includes the D3D commands 212, the D3D objects 214, and handles to recreate the actual D3D objects 214. The D3D plug-in 112 parses the received data streams 314 using any parsing methods known in the art and extracts the D3D commands 212 and the D3D objects 214.

The D3D plug-in 112 then executes the D3D commands 212 to display the graphics associated with the D3D application 410. For this, the D3D plug-in 112 communicates with a D3D API 424 of the clients 102 such as the client 102-1. The D3D API 424 communicates the D3D commands 212 and D3D objects 214 between the D3D plug-in 112 and the graphics hardware that executes the graphics applications. The D3D API 424 also includes commands for rendering graphics images that can be used to display the graphics.

The D3D API 424 further interacts with a Win32k process 426 to perform graphics related tasks such as creation of actual D3D objects 214 using the handles. The Win32k process 426 (a Windows® operating system kernel process) may be similar to the Win32k process 418 of the server 106. For the creation of actual D3D objects 214, the Win32k process 426 interacts with a GDI32 process 428, a Graphical Device Interface process that creates the actual D3D objects 214.

After creating the actual D3D objects 214, the GDI32 process 428 at the client side 404 communicates the D3D objects 214 to the D3D plug-in 112 via the D3D API 424. Further, the D3D plug-in 112 executes the D3D commands 212 using the D3D objects 214 and renders the graphics images 316. The D3D plug-in 112 renders the graphics images 316 similar to a GPU driver. The rendered graphics images 316 are then displayed through the input/output devices 310 of the client 102-1. In an implementation, each of the clients 102 can be a remote terminal server client 430. The D3D plug-ins at the clients 102 can keep the D3D objects 214 alive in a session during the rendering process, even when the clients 102 get disconnected and try to reconnect later. After successful reconnection, the server 106 and the clients 102 will resume the execution of the D3D application 410.

In an implementation, displaying the graphics of the D3D application 410 involves using one or more D3D resources such as texture map, normal map, etc. that can be shared by one or more of the clients 102. For the purpose of sharing the resources, the D3D plug-in 112 can be configured to assign a handle or an identifier to each of the D3D resources; however, use of handles may require one or more network roundtrips from the clients 102. To avoid continuous network roundtrips, a centralized server component, can be used as a proxy for the clients 102 to provide the assigned handles. For example, a RDPDD (Remote Desktop Protocol Device Driver) 432 or a RDPWD (Remote Desktop Protocol Win32k Driver) 434 can be used in the session space 406 or global space 408 respectively as a proxy for the clients 102.

Furthermore, one or more methods such as progressive texture rendering methods, frame rate control methods and auto-reconnection methods can be implemented in the D3D remoting architecture. In one implementation, the D3D application 410 may also deal with D3D resources such as meshes and textures that consume more network bandwidth in order to achieve better end user experience. In such cases, the progressive texture rendering method can be configured to allocate the bandwidth efficiently and achieve better end user experience.

Further, the D3D abstraction module 118 can use frame rate control methods that allow the server 106 to regulate the bandwidth consumption by limiting the frame transfer rate based on the type of the D3D application 410. Such frame rate control methods can improve scalability and consistency among multiple connections and applications.

In addition, auto-reconnection methods can be implemented to provide seamless remote auto-reconnection experience from the D3D application 410. For example, when a client 102 gets disconnected during the execution of the D3D application 410, a new client that is capable of supporting the running D3D application 410 may be connected. In one implementation, during the reconnection of a new client, the D3D application 410 receives a message such as DEVICE_LOST or DEVICE_REMOVED. The D3D abstraction module 118 then restores the D3D application 410 to the pre-disconnection state and resumes the execution of the D3D application 410. In another implementation, during the reconnection of a new client, the D3D abstraction module 118 performs complete abstraction of the D3D commands 212 and the D3D objects that are needed to recreate the object content at the server side 402.

Additional methods can be employed to ensure that the server 106 does not accumulate unbounded number of D3D commands 212 during a disconnected session. In the present implementation, to avoid unbounded number of D3D commands 212 at the server 106, one or more kernel threads that call the D3D application 410 can be blocked.

Exemplary Processes

Exemplary methods of implementing Direct3D remoting architecture are described below. Some or all of these methods may, but need not, be implemented at least partially in an architecture such as that shown in FIGS. 1-4. Also, it should be understood that certain acts in the methods need not be performed in the order described, may be modified, and/or may be omitted entirely, depending on the circumstances.

Figure 5:
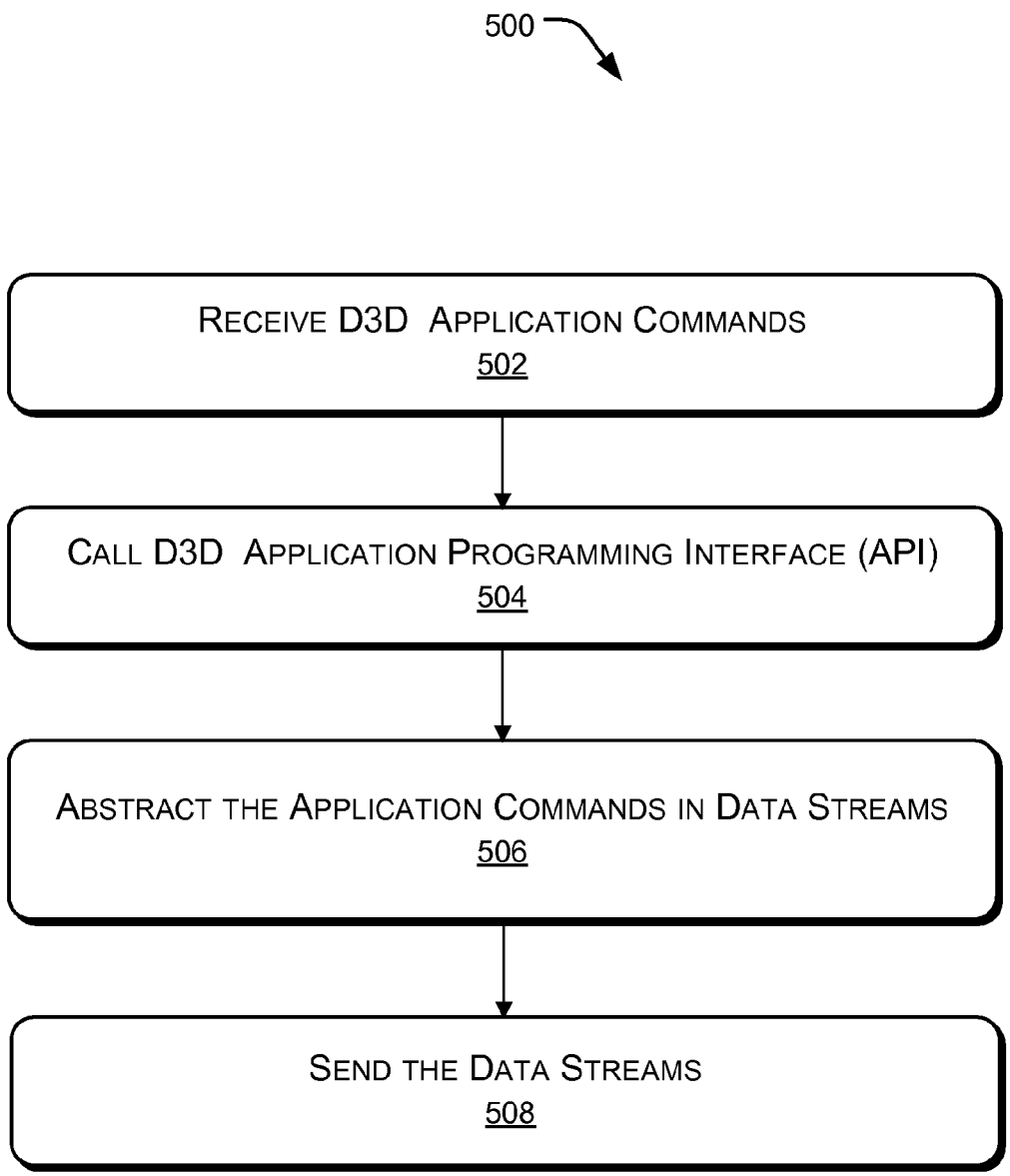
FIG. 5 is a flowchart illustrating an exemplary process for abstracting commands in 3D graphics applications.

FIG. 5 illustrates an exemplary process 500 for abstracting commands in D3D graphics applications at the server end. The order in which the exemplary process 500 is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502, one or more graphics application commands can be identified and received from a graphics application. The D3D abstraction module 118 may monitor and receive the graphics application commands from the D3D application 410 at the D3D abstraction layer 412.

At block 504, the application commands are communicated to the graphics hardware drivers through an API. The D3D abstraction module 118 may communicate the received commands 212 to the graphics hardware driver through the D3D API 414.

At block 506, the application commands and objects generated by the graphics hardware driver are abstracted in a data stream. The D3D abstraction module 118 may abstract the generated D3D commands 212 and the D3D objects 214 as hidden data in the data streams 216 to be sent over the network 104. Further, the D3D abstraction module 118 assigns a handle or an identifier to one or more D3D objects. The D3D abstraction module 118 records the handle in the data streams 216 along with other parameters that can be used to create the D3D objects 214 at the client 102-1.

At block 508, the data streams are sent over the network to the client. The D3D abstraction module 118 may send the data streams 216 to one or more of the clients 102 for example the client 102-1. The data streams 216 are then received by the D3D plug-in 112 of the client 102-1 as the data streams 314.

In one implementation, the D3D commands 212 and the D3D objects 214 in the data streams 216 can be compressed using any compression and decimation methods known in the art. Such techniques can be used, if, for example, the D3D resources such as textures, mesh data, and so on are large in size, and are unable to fit in the bandwidth of the network 104. The compressed D3D resources can be then sent over the network 104 through the remote adapter 120.

The remote adapter 120 enables the D3D abstraction module 118 to communicate with the D3D plug-in 112 of the client 102-1. For this, the remote adapter 120 checks availability and the capability status of the display adapter of the client 102-1. Once the confirmation is received from the D3D plug-in 112, the remote adapter 120 establishes a communication channel between the D3D abstraction layer 412 and the D3D plug-in 112. The D3D abstraction module 118 sends the data streams 216 via the established communication channel over the network 108 to the clients 102.

Figure 6:
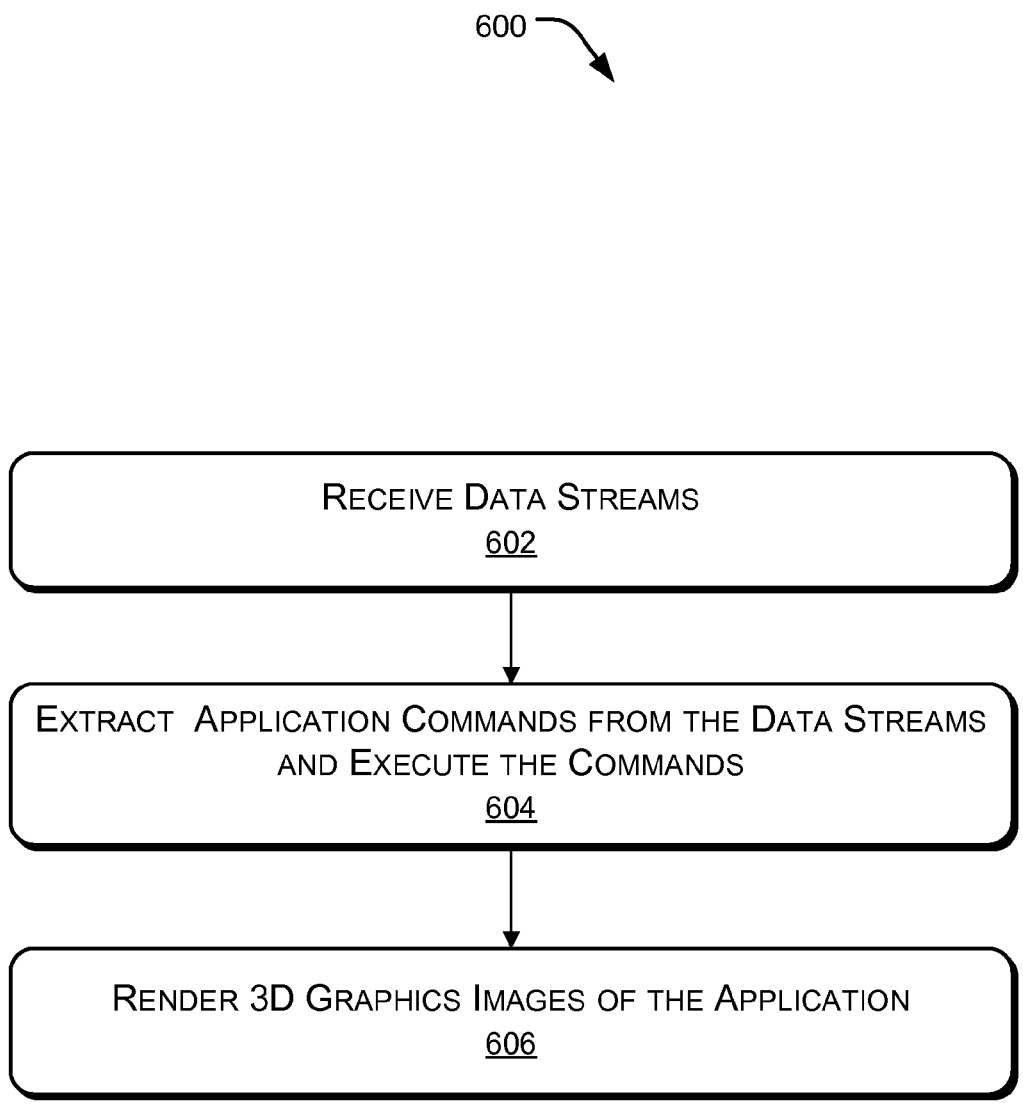
FIG. 6 is a flowchart illustrating an exemplary process for rendering 3D images.

FIG. 6 illustrates an exemplary process for rendering 3D images. The order in which the exemplary process 600 is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 602, data streams are received from the server. The D3D plug-in 112 of the client 102-1, may receive the data streams 314 from the D3D abstraction module 118 at the server 106.

At block 604, the D3D commands and the D3D objects are extracted from the data stream. The D3D Plug-in 112 may extract the D3D commands 212 and the D3D objects 214 from the data streams 314. Furthermore, the D3D Plug-in 112 can execute the D3D commands 212 with the help of the GPU of the client 102-1.

At block 606, the output in the form of graphics images is rendered through input/output devices at the client. The output of the D3D application 410, such as 3D graphics images 316, can be rendered through the input/output devices 310 of the client 102-1 using any of the rendering algorithms known in the art.

Any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Communication media typically embodies computer-readable instructions, data structures, program modules, or other data on any information delivery media. Combinations of the any of the above should also be included within the scope of computer-readable media.

CONCLUSION

Although the invention has been described in language specific to structural features and/or methodological acts for implementing self-described rendering of data, it is to be understood that the invention is not necessarily limited to the specific features or acts described. Rather, the specific features and acts are disclosed as exemplary forms of implementing the invention.

What is claimed is:

1. A server computer comprising:
a memory;
a processor operatively coupled to the memory; and
a user space in the memory, that corresponds to one or more clients, the user space including an abstraction module to monitor data traffic that includes at least one three dimensional (3D) command and at least one 3D object, the abstraction module further configured to regulate bandwidth consumption by a first client of the one or more clients limiting a frame transfer rate based on one or more capabilities of the first client and a type of 3D application associated with the at least one 3D command and the at least one 3D object, and allocate bandwidth to the first client using progressive texture rendering,
the memory and processor being configured to receive device removed information associated with the user space and, when device removed information is received, to initiate a procedure for removing or reconnecting a client device associated with the user space.

2. The server computer of claim 1, wherein the memory includes program data that stores the 3D commands, the 3D objects, and data streams.

3. The server computer of claim 1, wherein the user space includes a remote adapter that enquires as to availability and capability of a display adapter at a client device.

4. The server computer of claim 3, wherein the remote adapter establishes a communication channel between the abstraction module and a plug-in of the client device, wherein the plug-in receives commands and 3d objects.

5. The server computer of claim 1, wherein the abstraction module is configured to receive the 3D commands and 3D objects from a 3D application through an application program interface (API) that includes functions to render 3D images in the 3D application.

6. The server computer of claim 1, wherein the abstraction module assigns identifiers to the 3D objects.

7. The server computer of claim 1, wherein the abstraction module abstracts the 3D commands and 3D objects into a data stream and sends the data stream to the one or more clients.

8. The server computer of claim 1, wherein the abstraction module performs centralized encoding by compression and decimation.

9. The server computer of claim 1, wherein the 3D commands are high frequency commands.

10. A client computer comprising:
a memory;
a processor operatively coupled to the memory;
a 3D plug-in in the memory that receives data streams that include 3D commands and 3D objects and extracts and the 3D commands using the 3D objects in a graphics rendering session, wherein capabilities of the 3D plug-in are transmitted to a server computer for determining a frame rate for an interaction with the server computer;
a graphics processing unit (GPU) that renders the extracted 3D commands; and
a device removed notification unit that notifies the server computer when the client computer has lost connection with the server computer, wherein, upon a disconnection of the client computer, the 3D plug-in is configured to maintain the rendering session until reconnection is established.

11. The client computer of claim 10, wherein the 3D plug-in parses the data streams and extracts 3D commands.

12. The client computer of claim 10, wherein the 3D plug-in creates 3D objects by identifying handles associated with the 3D objects in the data streams.

13. The client computer of claim 12, wherein the handles includes entries that include an address of a resource associated with a graphics application.

14. The client computer of claim 10, wherein the 3D plug-in presents 3D graphics in full screen user interface.

15. The client computer of claim 10, wherein the 3D plug-in sends synchronization information to a server.

16. The client computer of claim 10, wherein the 3D plug-in renders output graphics based on a client-side-only rendering protocol.

17. The client computer of claim 10, wherein the GPU generates a proxy window to produce geometrical changes occurring at a window in a server computer that sends the data streams.

18. A computer storage medium, the computer storage medium not consisting of a propagating signal, storing computer readable instructions that when executed by a processor cause a computer to perform a method comprising:
receiving and identifying one or more graphics application commands;
communicating the one or more graphics application commands to graphics drivers;
abstracting one or more application commands and objects generated by the graphics drivers based on the one or more graphics application commands in a data stream;
when a device removed communication is received from a client computer, initiating a device removed recovery process to resynchronize a server state on the computer and client state on a client computer; and
regulating bandwidth consumption by the client computer by limiting a frame rate based on a type of application associated with the application commands and objects and one or more capabilities of the client device.

19. The computer storage medium of claim 18, wherein communicating is through an application program interface.

20. The computer storage medium of claim 18, wherein the abstracting includes abstracting generated commands and objects as hidden data.

21. The computer storage medium of claim 18, the method further comprising sending the data streams over a network to one or more clients.

22. The computer storage medium of claim 21, the method further comprising compressing the data streams.

* * * * *